United States Patent [19]
Miyakoshi et al.

[11] Patent Number: 5,444,268
[45] Date of Patent: Aug. 22, 1995

[54] THIN FILM EL DEVICE

[75] Inventors: Atsushi Miyakoshi; Akira Matsuno, both of Hiratsuka, Japan

[73] Assignee: Kabushiki Kaisha Komatsu Seisakusho, Tokyo, Japan

[21] Appl. No.: 50,040

[22] PCT Filed: Nov. 2, 1990

[86] PCT No.: PCT/JP90/01426
§ 371 Date: Apr. 28, 1993
§ 102(e) Date: Apr. 28, 1993

[87] PCT Pub. No.: WO92/08333
PCT Pub. Date: May 14, 1992

[51] Int. Cl.$^6$ .................. H01L 31/0296; H05B 33/14
[52] U.S. Cl. ........................... 257/79; 257/103; 313/503
[58] Field of Search ............... 257/461, 463, 460, 103, 257/79

[56] References Cited

U.S. PATENT DOCUMENTS

| | | | |
|---|---|---|---|
| 4,717,858 | 1/1988 | Tanaka et al. | 313/503 |
| 4,900,584 | 2/1990 | Tuenge et al. | 427/66 |
| 5,101,288 | 3/1992 | Ohta et al. | 359/58 |

FOREIGN PATENT DOCUMENTS

| | | |
|---|---|---|
| 0125781 | 7/1983 | Japan . |
| 0121290 | 6/1986 | Japan . |
| 0005596 | 1/1987 | Japan . |
| 0100892 | 4/1989 | Japan . |

Primary Examiner—Robert P. Limanek
Assistant Examiner—Alexander Oscar Williams
Attorney, Agent, or Firm—Richards, Medlock & Andrews

[57] ABSTRACT

The present invention relates to a modification of a thin film EL device for performing an EL emission according to an electric field being applied, and in particular to a thin film EL device for providing a stable luminance for a long time and for improving the luminance of a blue color display. Therefore, a light emission layer (4) is composed of a sulfide of an alkaline earth metal as a basic material. Insulation layers (3) and (5) disposed adjacent to the light emission layer (4) are composed of a sulfate or a carbonate of an alkaline earth metal. The light emission layer (4) is composed of SrS as a basic material, Ce as a light emission substance, and a Pb dopant as a coactivator.

19 Claims, 2 Drawing Sheets ns 3 and 5, which sandwich the light emission layer 4, are composed of a sulfate or a carbonate of an alkaline earth metal.

THIN FILM EL DEVICE

TECHNICAL FIELD

The present invention relates to a modification of a thin film EL device for performing an EL emission according to an electric field being applied, and in particular, to a thin film EL device for providing a stable luminance for a long time and for improving the luminance of a blue color display.

RELATED ART

So far, various studies have been conducted for multicolor thin film EL devices. As basic materials for light emission layers, strontium sulfide (SrS) and calcium sulfide (CaS), which are sulfides of alkaline earth metals, are used. To cause such thin film EL devices to stably emit visible light, a suitable interface should be formed between a light emission layer and the insulation layers which sandwich the light emission layer. To do that, a device having insulation layers composed of a nitride such as $Si_3N_4$, AlN, or BN has been proposed as disclosed in, for example, Japanese Published Unexamined Patent Application (A) 62-5596.

However, even if the above-mentioned thin film EL device, which has insulation layers composed of a nitride, is used, the SrS or CaS as the basic material of the light emission layer reacts with moisture, $CO_2$, and so forth contained in the air. Thus, a partial conversion to an oxide (such as SrO and CaO) or a carbonate (such as $SrCO_3$ and $CaCO_3$) takes place, which results in aged deterioration of the light emission layer of the device. Thus, the luminance of the EL device diminishes in a short time.

In addition, SrS:Ce or $ZnS:TmF_3$ has been used as a light emission layer for a conventional blue color display thin film EL device.

However, although the light emission layer which is composed of SrS:Ce has the highest luminance in blue color display thin film EL devices, the luminance thereof is at most 1000 $cd/m^2$ when a sine wave of 5 kHz is applied to the light emission layer. When this device is used for a dot matrix display which is driven at 60 Hz, a luminance of 20 to 30 $cd/m^2$ is required, while for this use the maximum luminance of the device which is composed of SrS:Ce is at most 10 $cd/m^2$, which is ½ to ⅓ times that of the required luminance.

The present invention is made from the above-mentioned point of view. An object of the present invention is to provide a thin film EL device for continuously furnishing stable luminance for a long time and for enhancing the luminance of a blue color display at least two to three times that of the conventional devices.

SUMMARY OF THE INVENTION

The present invention is a thin film EL device, comprising a pair of opposed electrodes and a laminate composed of a light emission layer and an insulation layer, wherein the light emission layer is composed of a sulfide of an alkaline earth metal as a basic material, and wherein at least the insulation layer disposed adjacent to the light emission layer is either a sulfate or a carbonate of an alkaline earth metal.

Between the insulation layer and the electrodes, another insulation layer composed of $Ta_2O_5$, SION, or SiN:H can be disposed.

The light emission layer is composed of Ce as a basic material and a Pb dopant of 1 at% (atomic %) or less as a coactivator.

According to the above mentioned construction, since insulation layers are composed of a sulfate or a carbonate of an alkaline earth metal, which is a stable compound, they are not adversely affected by moisture, $CO_2$, and so forth contained in air. In addition, since the insulation layers contain the same alkaline earth metal as the light emission layer, whose basic material is a sulfide of the alkaline earth metal, a suitable interface can be formed, thereby preventing aged deterioration of the light emission layer.

Moreover, according to the present invention, Ce as a light emission substance is used and Pb of 1 at% as a coactivator is added thereto along with SrS as the basic material, thereby SrS:Ce, Pb is formed. Thus, besides the conventional excitation of Cs, there is another excitation due to an energy transmission from excited Pb to Ce. Therefore, the probability of excitation of the present invention is higher than that of the conventional SrS:Ce. In addition, since the light emission band of Pb is close to the light absorption band of Ce, energy is effectively transmitted from Pb to Ce. Thus, the luminance of the present invention is higher than that of the conventional devices which are composed of SrS:Ce.

BEST MODES FOR CARRYING THE INVENTION

With reference to the accompanying drawings, preferred embodiments of thin film EL devices according to the present invention are described.

Figure 1:
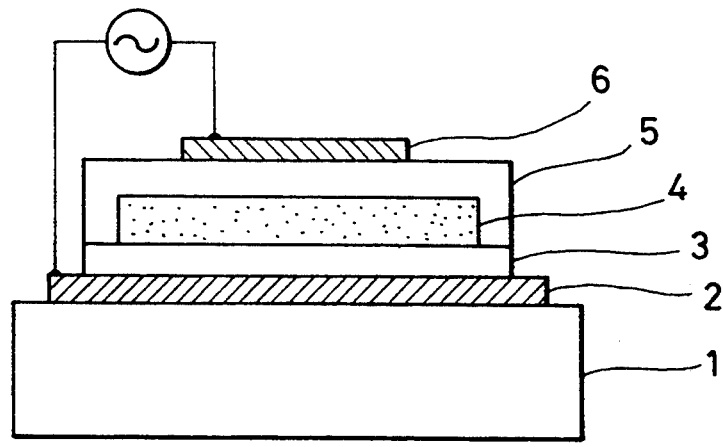
FIG. 1 is a schematic diagram showing the construction of a thin film EL device according to a first embodiment of the present invention.

FIG. 1 is a schematic diagram showing a thin film EL device according to a first embodiment. Over a glass substrate 1, a transparent electrode 2 composed of such as $In_2O_3$ or $SnO_2$ is formed. Over the transparent electrode 2, a first insulation layer 3 is laminated by, for example, the sputtering method. The first insulation layer 3 is composed of such as $SrSO_4$ or $SrCO_3$, which is a sulfate or a carbonate of an alkaline earth metal. Over the first insulation layer 3, a light emission layer 4 is formed by, for example, the vacuum evaporation method. The light emission layer 4 is composed of SrS as a basic material and Ce and Cl as light emission substances. Thus, the light emission layer 4 is composed of SrS:Ce, Cl. Over the light emission layer 4, a second insulation layer 5 and a metal electrode 6 are formed in succession. The second insulation layer 5 is composed of for example $SrSO_4$ or $SrCO_3$, which is the same compound that is contained in the first insulation layer 3. As illustrated in FIG. 1, the primary insulation layer 3 and 5 are disposed on opposing surfaces of light emission layer 4, with each of the primary insulation layers 3 and 5 being in contact with a respective opposing surface of the light emission layer 4. Insulation layer 5 extends around edges of layer 4 into contact with insulation layer 3. The electrode 2 is positioned in contact with a surface of insulation layer 2 which is remote from the light emission layer 4. Similarly, the electrode 6 is positioned in contact with a surface of insulation layer 4 which is remote from the light emission layer 4.

Figure 2:
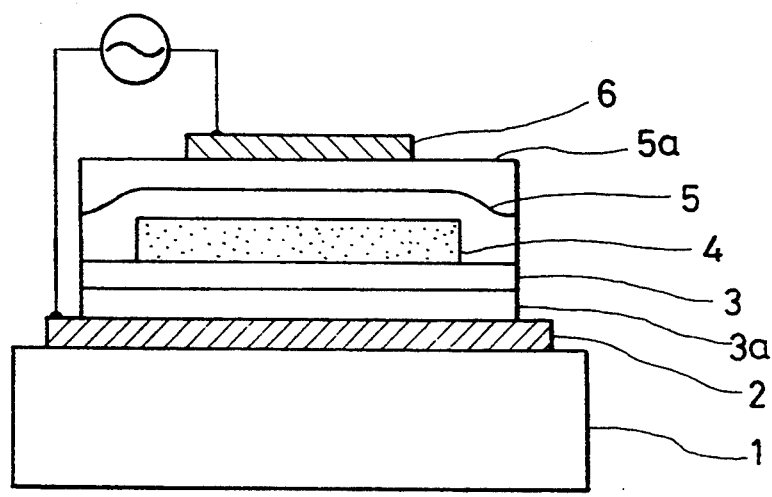
FIG. 2 is a schematic diagram showing the construction of a thin film EL device according to a second embodiment of the present invention.

FIG. 2 is a schematic diagram showing the construction of a thin film EL device according to a second embodiment of the present invention. In this embodiment, a transparent electrode 2 is formed over a glass substrate 1. The transparent electrode 2 is composed of, for example, $In_2O_3$ or $SnO_2$. An insulation layer 3a is formed between the transparent electrode 2 and a first insulation layer 3. In addition, an insulation layer 5a is formed between a second insulation layer 5 and a metal electrode 6. The insulation layers 3a and 5a are composed of, for example, $Ta_2O_5$, SION, or SiN:H. Thus, in the second embodiment, a plurality of insulation layers are formed. As illustrated in FIG. 2, the primary insulation layers 3 and 5 are again disposed on opposing surfaces of light emission layer 4, with each of the primary insulation layers 3 and 5 being in contact with the respective surface of the light emission layer 4. The secondary insulation layer 3a is positioned between and in contact with each of electrode 2 and primary insulation layer 3, with the contact between layers 3 and 3a being at a surface of primary insulation layer 3 which is remote from the light emission layer 4 so that the secondary insulation layer 3a is separated from the light emission layer 4 by the primary insulation layer 3. Similarly, the secondary insulation layer 5a is positioned between and in contact with each of electrode 6 and primary insulation layer 5, with the contact between layers 5 and 5a being at a surface of primary insulation layer 5 which is remote from the light emission layer 4 so that the secondary insulation layer 5a is separated from the light emission layer 4 by the primary insulation layer 5.

In each of the above-mentioned embodiments, the light emission layer 4, which is composed of a sulfide of an alkaline earth metal as a basic material, is sandwiched with the insulation layers 3 and 5 composed of a sulfate or a carbonate of an alkaline earth metal. In these embodiments, Ce and Cl were used as the light emission substance of the light emission layer 4. However, it should be noted that the present invention is not limited to such composition. Rather, other additives can be selectively used according to light emission colors.

As described above, since the above-mentioned stable compound is used for the insulation layers, it is not affected by moisture, $CO_2$, and so forth contained in air. Thus, aged deterioration of the device can be prevented. In addition, since the insulation layers contain the same element as the light emission layer, a suitable interface can be formed. Thus, the light emission layer can furnish stable luminance for a long time.

Figure 3:
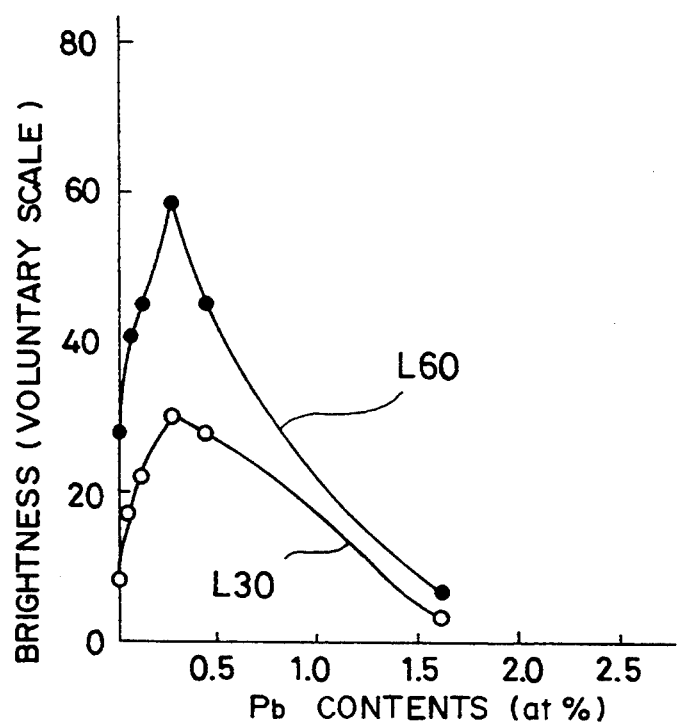
FIG. 3 is a graph showing a characteristic of luminance vs. added amount of Pb, for a 1 kHz sine wave applied to a blue color display thin film EL device according to a third embodiment of the present invention.

Next, a third embodiment according to the present invention is described. In this embodiment, SrS is used as a light emission basic material of a thin film EL device. Ce is used as a light emission substance. In addition, Pb is used as a coactivator. In this embodiment, five types of blue color display thin film EL devices were produced. In this embodiment, the added amount of Pb was changed, whereas Ce was fixed at 0.1 at%. As the added amounts of Pb (at%), 0.1, 0.2, 0.3, 0.4, and 1.7 were selected. In this embodiment, a 1 kHz sine wave was applied to these devices and the luminance of these devices was measured. In addition, the luminance of the conventional blue color display thin film EL device composed of SrS as a light emission basic material and Ce of 0.1 at% as a light emission substrate was measured. FIG. 3 shows the comparison results for these devices. Thus, in comparison with the conventional device (namely, Pb=0 at%), as the added amount of Pb increases, the luminance strengthens. In the case of Pb=0.3 at%, at L30 where the drive voltage rises by 30 V from light emission start voltage, the luminance is approximately tripled. At L60 where the drive voltage rises by 60 V from the light emission start voltage, the luminance is approximately doubled.

When at% of Pb exceeds 0.3, the luminance at both the L30 and L60 lowers. When at% of Pb is 1.7, the luminance is lower than that of the conventional device. Thus, it is preferred that at% of Pb should be 1 or less.

Figure 4:
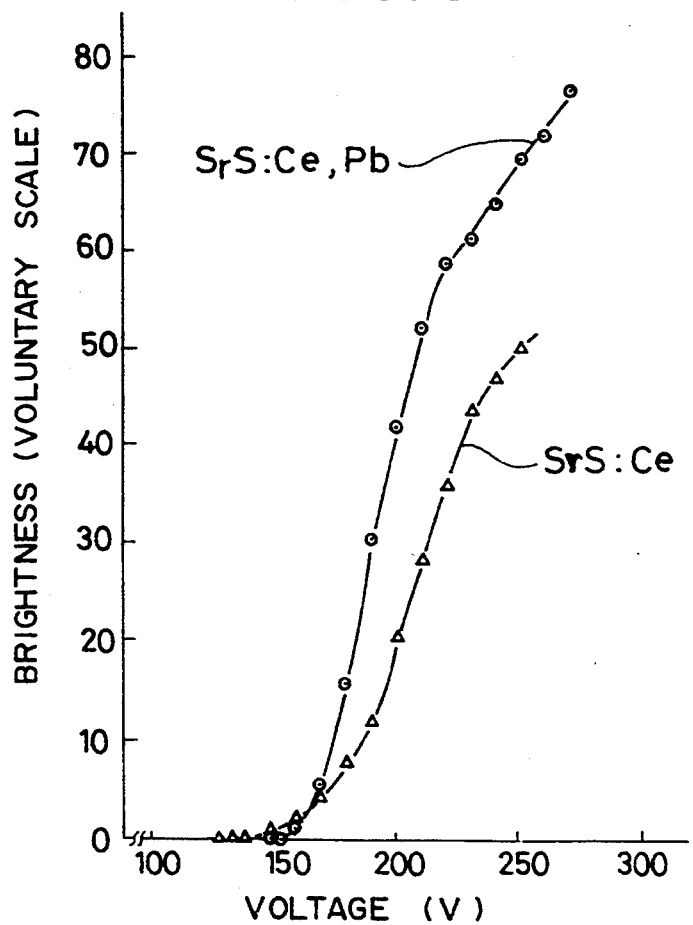
FIG. 4 is a graph showing a comparison between the third embodiment and a conventional blue color display device for a characteristic of luminance vs. voltage of a 1 kHz sine wave.

FIG. 4 is a graph showing a comparison between the third embodiment and a conventional blue color display device for a characteristic of luminanee vs. voltage for a 1 kHz sine wave. The device according to the present invention is composed of SrS: Ce, Pb where at% of Ce is 0.1 and at% of Pb is 0.3. The conventional device is composed of SrS:Ce where at% of Ce is 0.1. As shown in FIG. 4, according to the blue color display thin film EL device of the present invention, the luminance at 180 V (at L30 where the drive voltage rises from the light emission start voltage of 150 V by 30 V) is three times higher than that of the conventional device. The luminarice at 210 V (at L60 where the drive voltage rises from of the light emission start voltage of 150 V by 60 V) is double that of the conventional device.

As described above, since the light emission layer of the present invention is composed of SrS:Ce, Pb, the luminance thereof strengthens by two to three times that of the conventional device which is composed of SrS:Ce. Thus, the device according to the present invention can satisfy the required luminance for a dot matrix display. In addition, the luminance of the device can be sharply proportional to the voltage.

INDUSTRIAL APPLICABILITY

The present invention is useful for a thin film EL device which can furnish a stable luminanee for a long time. When a blue color display thin film EL device according to the present invention is used for a dot matrix display, a luminance of at least 20 to 30 cd/m2 can be obtained.

We claim:

1. A thin film EL device, comprising:
   a pair of opposed electrodes; and
   a laminate composed of a light emission layer and first and second insulation layers with said light emission layer being positioned between said first and second insulation layers, said laminate being positioned between said electrodes with each one of said first and second insulation layers separating a respective one of said electrodes from said light emission layer;
   wherein said light emission layer is composed of SrS as a light emission substance, Ce as a light emission substance, and Pb as a coactivator, wherein the amount of Pb coactivator does not exceed 1 atomic %.

2. A thin film EL device in accordance with claim 1, wherein the level of Pb in the light emission layer is less than about 0.4 atomic %.

3. A thin film EL device in accordance with claim 2, wherein the level of Ce in the light emission layer is about 0.1 atomic %.

4. A thin film EL device in accordance with claim 1, wherein the level of Pb in the light emission layer is about 0.3 atomic %.

5. A thin film EL device, comprising:
a pair of opposed electrodes;
a laminate composed of a light emission layer sandwiched between first and second insulation layers, said laminate being positioned between said electrodes, each of said electrodes being separated from said light emission layer by one of said first and second insulation layers;
wherein said light emission layer comprises a sulfide of an alkaline earth metal; and
wherein each of said first and second insulation layers contains a sulfate of an alkaline earth metal which is the same alkaline earth metal as in the sulfide of the alkaline earth metal in said light emission layer.

6. A thin film EL device, comprising:
a pair of opposed electrodes;
a laminate composed of a light emission layer sandwiched between first and second insulation layers, said laminate being positioned between Said electrodes, each of said electrodes being separated from said light emission layer by one of said first and second insulation layers;
wherein said light emission layer comprises a sulfide of an alkaline earth metal; and
wherein each of said first and second insulation layers consists of a carbonate of an alkaline earth metal which is the same alkaline earth metal as in the sulfide of the alkaline earth metal in said light emission layer.

7. A thin film EL device in accordance with claim 6, further comprising:
third and fourth insulation layers, said third insulation layer being disposed between one of said electrodes and said first insulation layer, said fourth insulation layer being disposed between the other one of said electrodes and said second insulation layer.

8. A thin film EL device in accordance with claim 7, wherein each of said third and fourth insulation layers comprises at least one member of the group consisting of $Ta_2O_5$, SION, and SiN:H.

9. A thin film EL device, comprising:
a pair of opposed electrodes;
a laminate composed of alight emission layer sandwiched between first and second insulation layers, said laminate being positioned between said electrodes, each of said electrodes being separated from said light emission layer by one of said first and second insulation layers;
wherein said light emission layer comprises strontium sulfide and cerium; and
wherein each of said first and second insulation layers comprises at least one material selected from the group consisting of a sulfate of an alkaline earth metal and a carbonate of an alkaline earth metal.

10. A thin film EL device in accordance with claim 9, wherein said light emission layer further comprises chlorine.

11. A thin film EL device in accordance with claim 9, wherein said light emission layer further comprises lead, with the level of lead in the light emission layer being less than about 1 atomic %.

12. A thin film EL device in accordance with claim 9, wherein said light emission layer further comprises lead, with the level of lead in the light emission layer being less than about 0.4 atomic %.

13. A thin film EL device in accordance with claim 12, wherein the level of cerium in the light emission layer is about 0.1 atomic %.

14. A thin film EL device in accordance with claim 12, wherein the level of lead in the light emission layer is about 0.3 atomic %.

15. A thin film EL device in accordance with claim 5, wherein said light emission layer comprises strontium sulfide, and wherein each of said first and second insulation layers comprises strontium sulfate.

16. A thin film EL device in accordance with claim 15, wherein said light emission layer further comprises cerium.

17. A thin film EL device in accordance with claim 16, wherein said light emission layer further comprises lead, with the level of lead in the light emission layer being less than about 1 atomic %.

18. A thin film EL device in accordance with claim 5, further comprising:
third and fourth insulation layers, said third insulation layer being disposed between one of said electrodes and said first insulation layer, said fourth insulation layer being disposed between the other one of said electrodes and said second insulation layer.

19. A thin film EL device in accordance with claim 18, wherein each of said third and fourth insulation layers comprises at least one member of the group consisting of $Ta_2O_5$, SiON, and SiN:H.

* * * * *